United States Patent [19]
Hoyle et al.

[11] 3,754,735
[45] Aug. 28, 1973

[54] POLYMER COLORATION

[75] Inventors: John Hoyle; Thomas Reuben Griffin, Kegworth, Near Derby, England

[73] Assignee: Slack & Parr Limited, Kegworth, England

[22] Filed: July 8, 1971

[21] Appl. No.: 160,813

[30] Foreign Application Priority Data
  July 8, 1970  Great Britain.................. 33,247/70

[52] U.S. Cl....................... 259/4, 137/566, 137/567
[51] Int. Cl........ B01f 13/10, B01f 15/04, B01f 5/14
[58] Field of Search ...................... 259/4, 7, 8, 18, 259/21, 22, 23, 24, 60, 154; 137/566, 567, 604; 418/196

[56] References Cited
UNITED STATES PATENTS

| | | | |
|---|---|---|---|
| 2,847,196 | 8/1958 | Franklin et al. ......................... | 259/8 |
| 2,965,119 | 12/1960 | Hawkinson et al. ............ | 137/566 X |
| 3,171,721 | 3/1965 | Strathearn et al. .................. | 259/8 X |
| 3,023,764 | 3/1962 | Dooley et al. .................. | 137/566 X |
| 3,272,141 | 9/1966 | Curry et al....................... | 418/196 X |
| 3,000,053 | 9/1961 | Hart................................. | 137/567 X |

*Primary Examiner*—John Petrakes
*Assistant Examiner*—Philip R. Coe
*Attorney*—Irvin S. Thompson and Robert J. Patch

[57] ABSTRACT

The invention concerns the coloration of hot melt polymer by direct injection of a dye into a stream of the polymer after or in a late stage of polymerisation e.g., before feed to a spinning machine.

Separate pressure-balanced continuous flow metering pumps respectively feed melted undyed polymer and melted concentrated-colour-dyed polymer to a mixer and the pumps are controlled to run in a speed relationship adjustable for colour and colour constancy. A three stage gear pump is preferably used for the colour-dyed polymer, undyed polymer being bled to the second inlet of this pump for premixing.

3 Claims, 2 Drawing Figures

3,754,735

POLYMER COLORATION

This invention relates to the coloration of hot melt polymer and has for its object to provide an improved method and improved apparatus for the direct injection of a dye into a stream of the polymer either after polymerisation or in a late stage of polymerisation. It is of particular advantage in the coloration of a hot melt polymer immediately prior to the latter being fed to a spinning machine.

According to the invention, apparatus for the coloration of a hot melt polymer comprises separate pressure-balanced continuous-flow metering pumps which respectively feed melted undyed polymer and melted concentrated-colour-dyed polymer to a mixer, the pumps being controlled to run in a speed relationship which is adjustable to determine the colour shade and maintainable for constancy of colour shade.

The actual speed may be controlled to vary the inputs and therefore also the common output of the mixer according to the requirements of a spinning machine or other forming device fed from the mixer.

Preferably a three-stage gear pump is employed for the colour-dyed polymer, which polymer is fed to one pump inlet, undyed polymer being bled from the mixed input line to the other pump inlet of the three-stage gear pump for premixing therein.

For the pressure feed of melted polymer to the continuous flow metering pumps to establish pressure balance therein, heated screw extruders may be used, or melting pots or conduits coupled to booster gear pumps, the extruders or melting pots being fed from hoppers, one for coloured chip polymer and the other for undyed chip polymer. Each of the two pressure feeds is, in the use of the apparatus, adjusted to approximate to the inlet mixer pressure so that inlet and outlet pressures of both metering pumps are all approximately equal. This ensures accurate metering and coloration.

The mixer, in which intimate mixing of the dye into the polymer is achieved, may be of the rotary type having a disc-type rotor which provides a mixing action which is a combination of shearing and dividing.

The invention also provides a method of colouring a hot melt polymer comprising the steps of melting undyed polymer chip and feeding it under pressure to a main continuous-flow metering pump discharging into a mixer, separately melting concentrated colour-dyed polymer chip and feeding it under pressure to a continuous flow colour metering pump discharging into said mixer, adjusting the speed relationship of the pumps for colour shade and maintaining that speed relationship for constancy of colour shade.

Two forms of apparatus for the coloration of a hot melt polymer, representing embodiments of the invention, and illustrative of the method of the invention, will now be described by way of example, and with reference to the accompanying drawings, in which.

Figure 1:
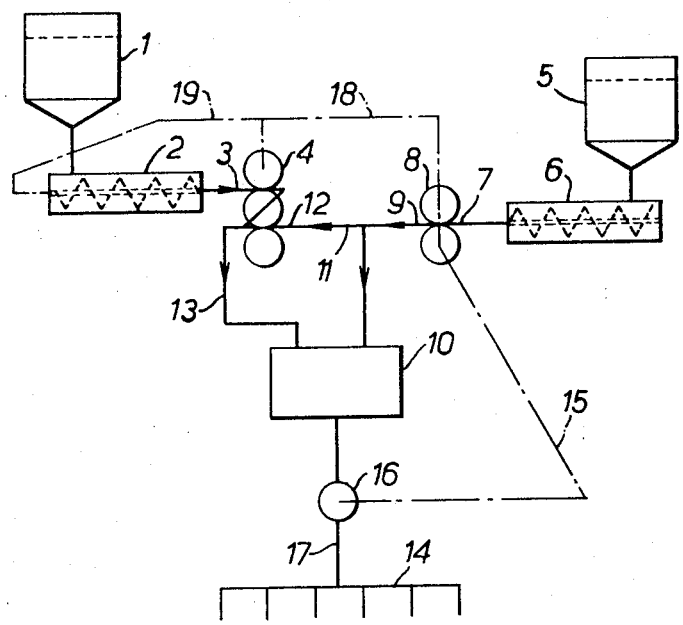
FIG. 1 illustrates the first of the two forms of apparatus.

In one of the forms, concentrated-colour-dyed polymer chip contained in a hopper 1 is fed into a screw extruder 2 in which the chip is melted. The output from the extruder feeds into one port 3 of a three-gear pump 4. Undyed polymer chip is contained in a second hopper 5 feeding a second screw extruder 6 in which the chip is melted. The output from the extruder 6 feeds into the inlet port 7 of a two-gear pump 8, the outlet from which is fed via a line 9 to a rotating disc-type mixer 10. In the line 9 between pump 8 and mixer 10 a tapping 11 is taken off and led into the second inlet 12 of the three-gear pump 4. A measure of premix is therefore obtained in the three-gear pump 4. Moreover, the introduction of undyed polymer into the pump 4 serves to reduce abrasive wear when the concentrated colour dye polymer is abrasive in nature.

The combined output of the three-gear pump is also fed over a line 13 into the mixer 10 where the final complete mixing with the main flow of polymer take place. The mixer 10 delivers into a manifold 14 supplying the individual metering pumps feeding spinnerets of a spinning machine.

The speed of the two-gear mixer feed pump 8 is variable to meet the demands of the spinning pumps. It may to this end be regulated to maintain a constant pressure head in the manifold 14. Control via a coupling 15 can be effected through the use of a pressure sensing transducer 16 located in the feed line 17 to the manifold 14 feeding the spinning pumps.

In order to maintain a constant proportion of dye to the main flow, the drive to the three-gear pump 4, whilst providing the facility for speed change independent of the main two-gear pump 8, to accommodate differing dye concentrations, is controlled by coupling 18 to run in a constant speed relationship to the main two-gear pump 8.

The screw extruder 2 feeding concentrated colour dyed polymer to the three-gear pump 4 may also have a speed control interlocked in a coupling 19 with the three-gear pump 4 to maintain a close pressure balance between both inlets 3 and 12 of this pump. Alternatively, the pressure/throughput characteristics of the extruder 2 may be designed to obviate the need for such interlock.

Figure 2:
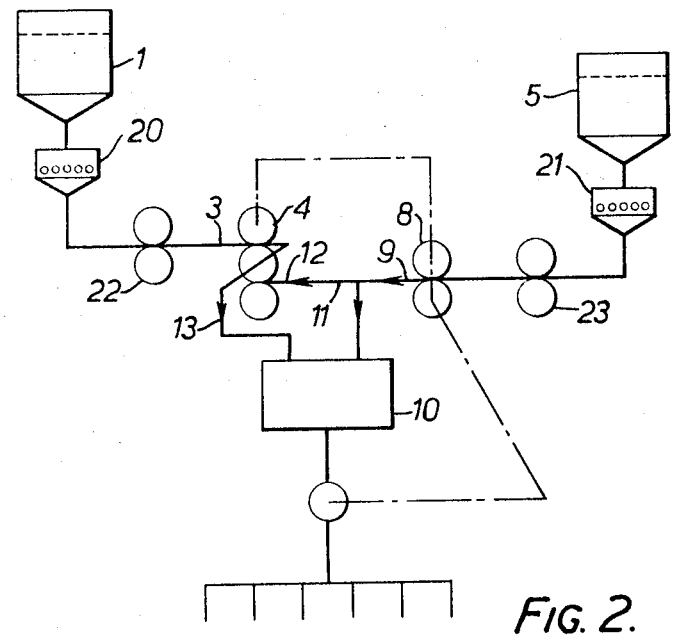
FIG. 2 illustrates the second form of apparatus.

In the variant arrangement shown in FIG. 2 there is provided, instead of the screw extruders 2 and 6, separate melting pots 20 and 21 or equivalent feeding booster gear pumps 22 and 23. Each of these pumps 22, 23 fulfils the function of a screw extruder as a pressure generating device and maintains a pressure balance across the two inlets 3 and 12 of the three-gear pump 4 as in the previous arrangement.

In both the arrangements described all the pumps and the mixer, also the screw extruders where used, are contained within temperature controlled zones, and the temperature is maintained above the melt temperature of the polymer.

We claim:
1. A method of producing coloured hot melt polymer which comprises the steps of:
   a. melting undyed polymer chip and feeding it under pressure to a first continuous flow metering pump the discharge outlet of which is connected by a main line to a mixer and by a branch line to an inlet of a second continuous flow metering pump,
   b. separately melting concentrated colour-dyed polymer chip and feeding it under pressure to another inlet of the second continuous flow metering pump, the discharge outlet of said second pump being connected to the mixer, and
   c. providing means downstream of the mixer controlling the rates of operation of the pumps in dependence on the pressure of the coloured hot melt polymer passing along a feed line issuing from the mixer.

2. Apparatus for producing coloured hot melt polymer which includes:
1. a first continuous flow metering pump having an inlet and a discharge outlet,
2. a second continuous flow metering pump having a pair of inlets and a discharge outlet,
3. means for melting undyed polymer chip and means for feeding said hot melt polymer under pressure to the inlet of the first continuous flow metering pump,
4. separate means for melting concentrated colour-dyed polymer chip and means for feeding said dyed hot melt polymer under pressure to one of the inlets of the second continuous flow metering pump,
5. a mixer,
6. a main line extending from the discharge outlet of the first continuous flow metering pump to the mixer,
7. a branch line extending from the main line to the other inlet of the second continuous flow metering pump,
8. a line extending from the discharge outlet of the second continuous flow metering pump to the mixer,
9. a feed line issuing from the mixer and
10. means in said feed line for sensing the pressure of hot melt polymer therein and for controlling the rates of operation of the pumps in dependence on said pressure.

3. Apparatus according to claim 2, wherein the means for feeding hot melt polymer to each continuous flow metering pump comprises a respective screw extruder.

* * * * *